Patented Mar. 31, 1925.

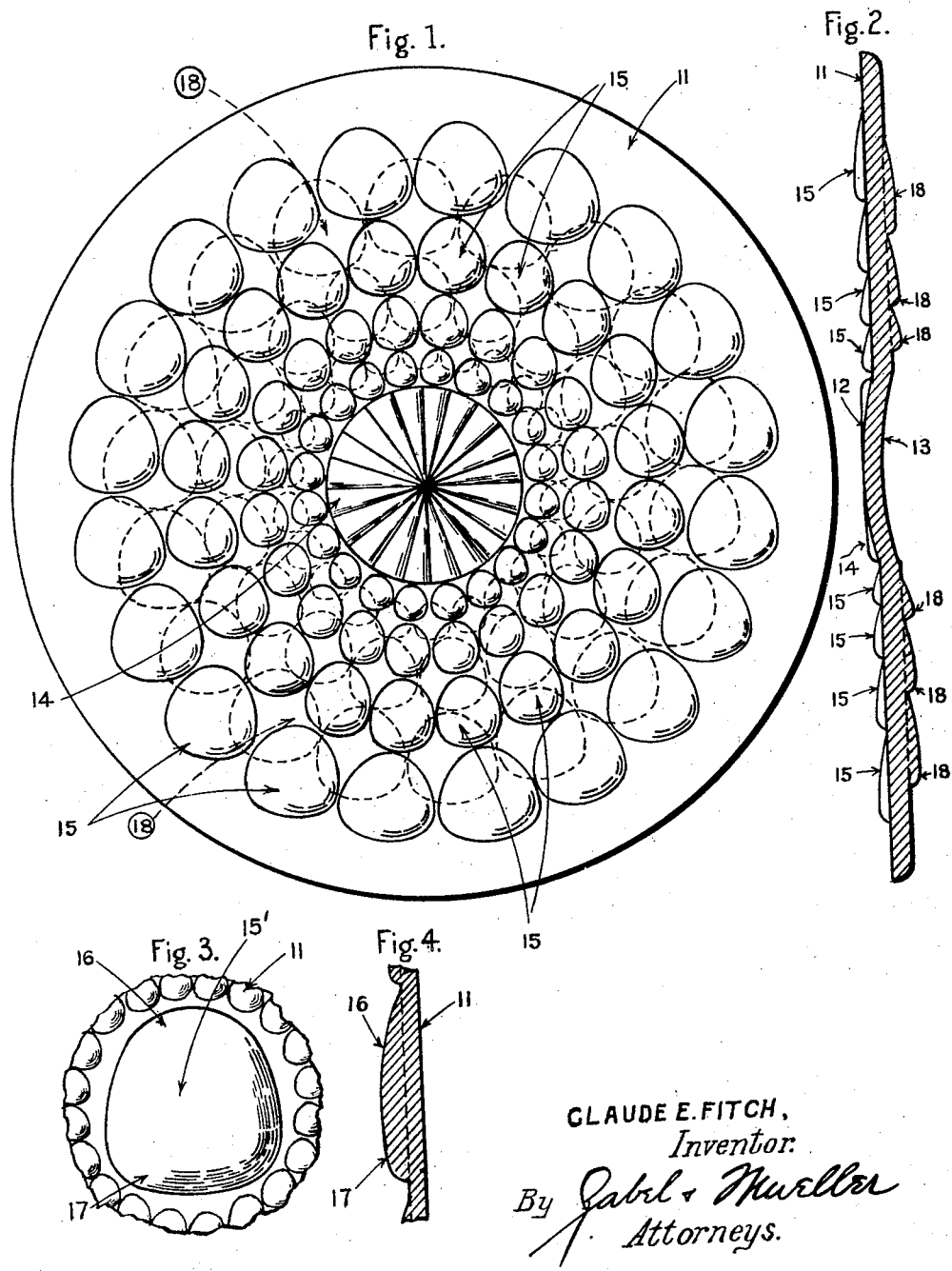

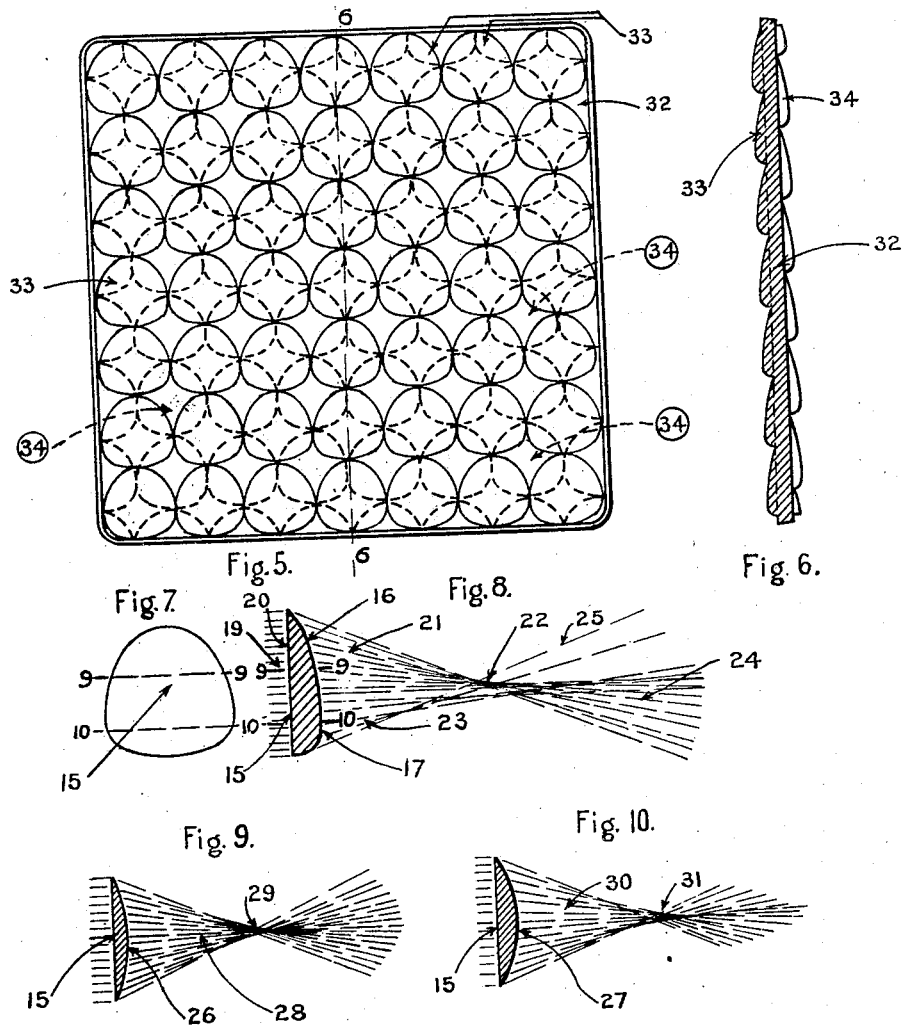

1,531,480

UNITED STATES PATENT OFFICE.

CLAUDE E. FITCH, OF WILMETTE, ILLINOIS.

LENS.

Application filed September 25, 1922. Serial No. 590,334.

*To all whom it may concern:*

Be it known that I, CLAUDE E. FITCH, a citizen of the United States, residing at Wilmette, in the county of Cook and State of Illinois, have invented a certain new and useful Improvement in Lenses, of which the following is a full, clear, concise, and exact description, reference being had to the accompanying drawings, forming a part of this specification.

My invention relates to lenses, and more particularly to a lens for automobile head lights.

It is a purpose of the invention to provide a lens so that the light passing through the same is directed downwardly toward the roadway so as to prevent the same from shining into the eyes of drivers of automobiles approaching the automobile having head lights provided with the lens referred to above, only a small portion of the light passing up beyond a predetermined horizontal plane.

It is a further purpose of the invention to provide a lens of the above mentioned character which is made up of a plurality of small lenses, each adapted to direct the light downwardly, said lenses being so positioned relative to each other that the light will be deflected by each of them in substantially the same direction. Preferably they are arranged with the said axis of each extending vertically so that the lenses will all combine to deflect the light in the same direction, preferably downwardly below a predetermined horizontal plane.

It is a further object of the invention to provide a light deflecting device which is adapted to direct light shining through the same in any desired direction, said device comprising a plurality of lenses arranged with their axes in parallel relationship, the axes being so arranged that the light will be directed in the same direction by all of said devices.

It is another purpose of the invention to provide the small lenses on either of the light deflecting devices referred to above in staggered relationship on opposite sides of the light deflecting member so that substantially the entire surface thereof is utilized to deflect the light downwardly or in any other desired direction. The individual small lenses, of which the lens or other light deflecting device is made up, preferably comprise an upper portion having a long radius of curvature and a lower portion having a short radius of curvature, said upper portion being much larger than the lower portion, whereby a lens is obtained that will deflect the light downwardly from said upper portion, thus distributing the major portion of the light striking the lens in a downward direction. The portion of the lens having the shorter radius of curvature may be comparatively small and a small portion only of the light passes through the same so that only a very small portion of the light will pass upwardly from said lower portion of the lens.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a front elevation of an automobile head light lens made in accordance with my invention;

Fig. 2 is a vertical sectional view thereof;

Fig. 3 is a fragmentary plan view of an alternative form of center for the lens;

Fig. 4 is a vertical sectional view of said center;

Fig. 5 is a front elevational view of a light deflecting device used for any other purpose;

Fig. 6 is a section thereof taken on the line 6—6 of Fig. 5;

Fig. 7 is a diagrammatic view of one of the lenses;

Fig. 8 is a vertical sectional view thereof showing the manner in which the light passes through the same;

Fig. 9 is a horizontal sectional view thereof taken on the line 9—9 of Fig. 7 showing the manner in which the light passes through the same; and Fig. 10 is a section taken on the line 10—10 of Fig. 7 showing the manner in which the light passes through the same.

Referring in detail to the drawings, in Fig. 1 is shown an automobile head light lens 11 which is circular as is customary, and which is provided with a central convex outer surface 12 and a concave inner surface 13 opposite thereto, said surface 12 being provided with radial rib portions 14, as shown in Fig. 1. Said lens 11 is also provided with a series of smaller lens formations thereon arranged in a plurality of circular series about said central concavo-convex portion 12—13. Said lens formations are designated by the numeral 15, and it will be seen that the outer series are larger than the next adjacent series and that the lenses of the series decreasing in size toward the center of said lens. The lenses 15 are formed integral with the member 11 and comprise an upper portion having a surface 16 that has a comparatively long radius of curvature and a lower portion having a surface 17 that has a very short radius of curvature, said surface 16 gradually merging into the surface 17 at the junction of the two portions. Arranged oppositely to the lens formations 15 and in staggered relationship thereto are the lens formations 18 which are similar in shape and arrangement to the lens formations 15. As the lens formations 18 are arranged in staggered relationship to the lens formations 15, substantially the entire surface of the lens member 11 will be covered by said two sets of lens portions.

Referring to Figs. 7 and 8, it will be seen that if the lens member is cut along a vertical axis in Fig. 7, or what may be regarded as the longitudinal axis of the lens, the same will appear as in Fig. 8, and parallel rays of light striking the opposite face 20 of the lens to the surfaces 16 and 17 will pass through the lens substantially as shown in Fig. 8, the deflected rays 21 passing through the upper portion of the lens being drawn downwardly in passing through the focus 22, said parallel rays 20 being deflected downwardly substantially throughout the entire upper portion of the lens located above the plane 10—10, whereas the parallel rays of light striking the portion 17 of the lens will deflect upwardly as shown at 23. It will be seen that beyond the focus 22 the rays 21 will spread out, as shown at 24, below the horizontal plane passing through said focus, whereas a few scattered rays 23 from the portion 17 will pass beyond the focus and upwardly as indicated at 25. Upon reference to Fig. 8 it will be seen that a very small portion of the light will pass through the portion 17 of the lens and that this light is very widely scattered, thus having no very undesirable effect.

It will be seen upon referring to Fig. 1 that the longitudinal axes of the lens portions 15 and the similar lens portions 18 are all arranged in parallel relationship, and when the lens member 11 is inserted in an automobile head light, said longitudinal axes extend vertically with the portions 17 of the said lenses extending downwardly. The lens member 11 will accordingly deflect substantially all of the light downwardly, the portion 12 merely diffusing some of the light and having no undesirable effect.

It will be seen from Figs. 9 and 10 that the lens members 15 are also transversely curved, providing the transversely curved surfaces indicated by the numeral 26 in Fig. 9 and the numeral 27 in Fig. 10. It will be noted that the upper portion of the lens has the surface 26 thereof of a much greater radius of curvature than the lower portion of the lens, and accordingly the rays indicated by 28 in Fig. 9 will have a longer focus 29 than the rays 30 passing through the more sharply curved surface 27 which will have a focus substantially at 31. It will be evident that due to the curvature of the lens in both a longitudinal and transverse direction, the light will be deflected downwardly and distributed over a surface of the desired width upon the roadway without having any large number of upwardly deflected rays which would be undesirable due to the fact that it will shine into the eyes of the driver of the automobile going in the opposite direction to the one having the lens thereon. The lens formations 18 are of substantially the same shape as the lens formations 15.

It will be evident that the same lenses can be used for deflecting light passing through a partition or window in a building or any similar member into any desired direction as the lens formations could be arranged so as to throw the light upwardly, downwardly, or to the left or right, or in any other desired direction.

In Figs. 5 and 6 a window pane 32 is shown which is provided with the lens formations 33 and 34 thereon, similar to the lens formations 15 and 18 on the lens member 11, said members being arranged with their longitudinal axes in parallel relationship as previously described, and in Figs. 5 and 6 said axes are shown as extending vertically so as to throw the light downwardly. It will be seen that the members 33 and 34 are arranged in staggered relationship so as to obtain the desired deflection of the light throughout substantially the entire area of the glass.

Instead of using the center 12 shown in Fig. 1, a lens 15′, shown in Figs. 3 and 4 which is of the same construction as the lenses 15, may be used. In this form the central lens 15′ also throws the light downwardly.

Having thus described my invention, what I desire to claim and secure by U. S. Letters Patent is:

1. A device of the character described, comprising a plurality of lens portions, said lens portions each having unsymmetrically curved outer faces formed so as to deflect more of the light passing through the same in one direction than in another direction, said lens portions having the unsymmetrical curvatures thereof so relatively arranged as to all direct the light in the same direction.

2. A device of the character described, comprising a member having a plurality of lens formations thereon, said lens formations being arranged in concentric circular series and each being curved symmetrically relative to a vertical axis, and unsymmetrically relative to a horizontal axis, said lenses being so formed as to have the major portion of each located above said horizontal axis.

3. A device of the character described, comprising a member having a plurality of lens formations thereon, said lens formations being arranged in concentric circular series and each being symmetrical relative to a vertical axis, and unsymmetrical relative to a horizontal axis, said lenses being so formed as to have the major portion of each located above said horizontal axis and having a greater radius of curvature above said horizontal axis than below the same, whereby the major portion of the light passing through said member is directed downwardly.

In witness whereof, I hereunto subscribe my name this 18th day of September, A. D. 1922.

CLAUDE E. FITCH.